United States Patent [19]

Hilakos

[11] Patent Number: 4,864,964

[45] Date of Patent: Sep. 12, 1989

[54] APPARATUS AND METHOD FOR IMPREGNATING CONTINUOUS LENGTHS OF MULTIFILAMENT AND MULTI-FIBER STRUCTURES

[75] Inventor: William Hilakos, Mt. Vernon, Ind.

[73] Assignee: General Electric Company, Mt. Vernon, Ind.

[21] Appl. No.: 133,418

[22] Filed: Dec. 15, 1987

[51] Int. Cl.⁴ ............................................. B05C 11/02
[52] U.S. Cl. .................................... 118/117; 118/405; 118/420; 118/427; 118/428; 156/180; 156/245; 156/441; 264/136; 264/174; 425/93; 425/114
[58] Field of Search ............... 118/423, 427, 405, 117, 118/420; 427/434.4; 68/43, 44, 45, 46, 282; 156/180, 245, 441; 264/136, 174; 425/93, 114

[56] References Cited

U.S. PATENT DOCUMENTS 3,503,371  3/1970  Meyers et al. ..................... 118/405
3,554,113  1/1971  Page ................................... 68/43 X
3,986,477 10/1976  Bigland ............................ 118/405 X
4,643,126  2/1987  Wilkinson et al. ........... 427/434.4 X Primary Examiner—Shrive P. Beck
Assistant Examiner—Alain Bashore
Attorney, Agent, or Firm—Joseph T. Eisele; Martin B. Barancik

[57] ABSTRACT

Apparatus for the impregnation of a continuous length of multifilament or multifiber yarns with a molten thermoplastic polymeric resin includes a pair of convex/concave (mating) surfaces for spreading the multifilaments or multifibers apart during their immersion in a bath of the molten resin. The shape, configuration and location of the surfaces facilitates homogeneous impregnation, particularly with highly viscous metls, to produce a uniform and thorough encapsulation of the filaments or fibers.

12 Claims, 2 Drawing Sheets

APPARATUS AND METHOD FOR IMPREGNATING CONTINUOUS LENGTHS OF MULTIFILAMENT AND MULTI-FIBER STRUCTURES

BACKGROUND OF THE INVENTION

1. Field of the Invention

The invention relates to methods and apparatus for impregnating continuous lengths of fiber and filament structures such as yarns, with polymeric resins.

2. Brief Description of the Prior Art

A wide variety of methods and devices have been proposed for impregnating yarns and like structures composed of textile fibers and/or filaments with polymeric resins; see for example the U.S. Pat. No. 3,413,186 which describes the impregnation of yarns of glass fibers. In general, one of the problems faced by the artisan has been the achievement of a product wherein the multitude of individual filaments or fibers such as glass fibers is completely wetted and encapsulated with the resin impregnate so as to eliminate air pockets or voids between fibers. Unless this is accomplished, fibers will be in physical contact with each other and free to abrade, one upon the other. This of course leads to a reduced life for the structure made up of the filaments or fibers. The problem is especially difficult when the polymeric resin is a relatively viscous thermoplastic resin of a desirably high inherent viscosity.

Another problem of the prior art relates to effecting a spreading of the fibers or filaments from each other so that the impregnate can thoroughly "wet" and encapsulate the individual fibers or filaments. The prior art is replete with descriptions of methods and apparatus having an objective of solving this particular aspect of the above-described problems. Representative of such descriptions are those found in the U.S. Pat. No. 2,730,455 to Swann, concerning filament separation by an electrostatic force; U.S. Pat. No. 3,413,186 to Marcoccli where elements are provided to flex and bend the multi-filament or fiber length during its residence in an impregnating fluid; U.S. Pat. No. 3,422,796 to Baber which describes the mechanical separation of multifilaments on a grooved surface; U.S. Pat. No. 3,779,844 to Dorsch who employed vibrators to effect the desired separation; U.S. Pat. No. 3,798,095 to Hall who employed acoustic vibrations; U.S. Pat. No. 4,312,917 to Hawley who in an effort to simplify apparatus merely inserted lobes in the path of the multifilament length during its contact with the impregnant; and U.S. Pat. No. 4,541,884 to Cogswell et al. which describes the use of series of rods which function as "spreader surfaces". The latter patent is particularly noteworthy because it describes a method and apparatus having a purpose to solve one of the problems solved by the present invention, i.e.; the uniform and thorough impregnation of a continuous length of a multifilament yarn with a relatively high molecular weight, relatively viscous polymeric resin. However, the improvements noted by Cogswell et al. are not entirely related to the apparatus, but are also dependent on the use of a volatile plasticizer in admixture with the thermoplastic resin. Such a condition is not always acceptable to the artisan who may be severely restricted by the environmental impact of disposal of the volatilized plasticizer. Also, the presence of a plasticizer in certain proportions may be degraditive of the resin.

Also of interest for its representation of the state of the art, is the description given in the U.S. Pat. No. 3,694,131.

The apparatus and the method of the present invention provides a simplified means of completely wetting and impregnating a continuous length of multifilament or multifibered yarns with a thermoplastic polymeric resin of both relatively high and relatively low viscosity.

SUMMARY OF THE INVENTION

The invention comprises apparatus for impregnating a continuous length of multifilaments or multifiber with a polymeric resin, which comprises;

a housing enclosing a molten, thermoplastic polymeric resin chamber and having a housing wall defining the chamber;

an inlet through the wall, providing open fluid communication between the chamber and the exterior of the housing;

an outlet through the wall, providing open fluid communication between the chamber and the exterior of the housing;

means for introducing molten, thermoplastic polymeric resin into the inlet associated the inlet;

means for introducing into the chamber, a continuous length of multifilament or multifibers;

a sizing die associated with the outlet for sizing the continuous length following impregnation in the chamber;

a pathline through the chamber, between the means for introducing the continuous length into the chamber and the outlet and the sizing die;

a convex surface mounted in the chamber and on the pathline; in the chamber and on the pathline, spaced apart from the convex surface and opposite the convex surface, whereby a passage on the pathline is formed for travel of the continuous length between the concave and the convex surfaces, said traveling length being in contact with both concave and convex surfaces.

The invention also comprises a method of impregnating continuous lengths of multifilament or multifiber yarns, employing the apparatus of the invention.

By the term "continuous length of multifilaments or multifibers" we mean any fibrous or filamentous structure such as a yarn, in which the fiber/filaments are sufficiently long to give a roving, tow or yarn of sufficient strength, under the processing conditions described hereinafter, to be poltruded through a molten thermoplastic polymer resin and a sizing die without such a frequency of breakage as to render the impregnated length unusable.

DETAILED DESCRIPTION OF THE PREFERRED EMBODIMENTS OF THE INVENTION

Figure 1:
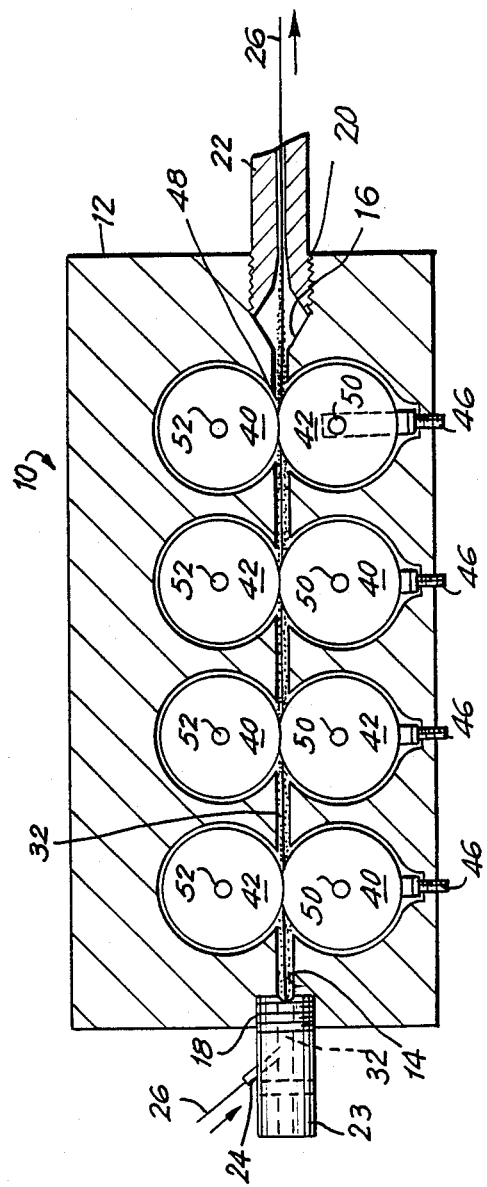
FIG. 1 is a side view of an embodiment apparatus of the invention, in cross section and shown in operation.

The method and apparatus of the invention may be used to impregnate a wide variety of multifilament and multifiber structures in continuous lengths. Representative of such structures are multifilament or multifiber lengths of glass, carbon, jute, and of synthetic polymeric resins such as polyester, polyolefin, polyamide, aramid and like resins fabricated into, for example, multifilament or multifibered yarns or threads. The method and apparatus of the invention are particularly useful to impregnate continuous lengths of glass fibers, and the following description will be directed to that embodiment as representative of materials which may be subjected to the method of the invention.

The term "glass fiber" is used herein to mean fibers of a glass composition in the form of filaments, strands, yarns, bundles, cords and the like; said fibers including cut, chopped or discontinuous fiber length as well as continuous filaments. The continuous length of glass fibers impregnated in accordance with the present invention may be untreated or treated with anchoring agents or the like to improve bonding to the polymeric resin impregnants.

The apparatus of invention may be used to homogeneously impregnate glass fibers (or other fibers and filaments as previously described) structured in a continuous length, with a wide variety of polymeric resins such as synthetic and natural resin elastomers, thermosetting resins and synthetic, thermoplastic polymeric resins such as polyolefins, polyurethanes, polyamides, polyesters, polycarbonates and the like. Resin forming compositions may also be impregnated into the glass fibers and the resins formed in-situ by known methods. For example, polyurethane elastomer precursors (a polyisocyanate and a polyol or a polyurethane propolymer) together with a reaction catalyst and/or an extender may be impregnated into a glass strand structure and curing allowed to occur for the in-situ formation of a polyurethane impregnant. The in-situ preparation of such elastomers is well known; see for example the U.S. Pat. No. 4,008,197. The apparatus of the invention is particularly useful to impregnate glass fibers with thermoplastic resins, under sufficient heat to liquefy (thermoplasticize) the resin.

A preferred use of the apparatus of the invention is to impregnate continuous lengths of multifilament or fibers with low viscosity materials which are intermediates for high polymers.

The term "low viscosity" generally means an intrinsic viscosity below about 0.40 dl/g as measured in methylene chloride at a temperature of 25° C. (for a polycarbonate) or an equal melt viscosity for other prepolymer compositions.

Although a wide variety of low viscosity oligomer and prepolymer resin compositions are known, including but not limited to prepolymers of polyolefins, polyurethanes, and the like, a preferred use is made of a reactive polycarbonate oligomer such as a cyclic carbonate. Such oligomers are well known as is the method of their preparation; see for example U.S. Pat. No. 4,644,053 which is hereby incorporated herein by reference thereto.

As mentioned above, the method and apparatus of the invention are particularly advantageous for impregnating continuous lengths of glass fibers with relatively high viscosity, molten resins such as polycarbonate resins. The term "high viscosity" generally means an intrinsic viscosity between about 0.4–0.5 dl/g as measured in methylene chloride at a temperature of 25° C. (for a polycarbonate) or an equal melt viscosity for other polymers.

Those skilled in the art will gain an appreciation of the invention from a reading of the following description of the preferred embodiments, in conjunction with a viewing of the accompanying drawings of FIGS. 1–4 inclusive.

Figure 3:
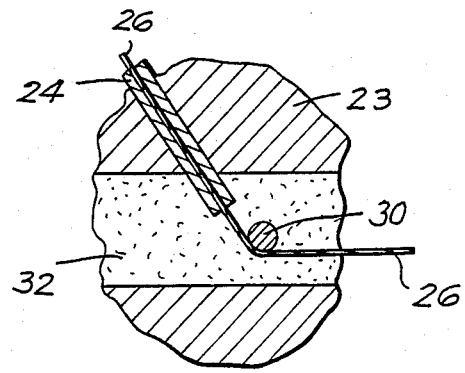
FIG. 3 is an enlarged view of the adapter and inlet of the apparatus 10, shown in cross-section.

FIG. 1 is a cross-sectional side-view of a an embodiment apparatus 10 of the invention, to show its operation. The apparatus 10 comprises a housing 12 enclosing a molten, thermoplastic polymeric resin chamber 14 with its wall 16. The resin chamber 14 is substantially closed and sealed from the atmosphere by the housing 12. As shown in the preferred embodiment apparatus 10 of the invention, the resin chamber 14 traverses the interior of the housing 12 in an axial line extending between inlet 18 and outlet 20. The outlet 20 is fitted with a sizing die 22 while the inlet 18 is fitted with an adapter 23 for connection with a thermoplastic resin extruder (a conventional extruder, not shown in FIG. 1). A preferred sizing die 22 is described in the U.S. patent application Ser. No. 133,404 filed Dec. 15, 1987, now U.S. Pat. No. 4,778,367 filed on the same day as this application. The resin chamber 14 is filled with a molten, thermoplastic polymeric resin when the extruder discharges molten resin through the adapter 23 and into the inlet 18. In this way, the resin chamber 14, during operation of the apparatus 10, is always filled with molten, thermoplastic resin for impregnating a continuous of multi-filament or multi-fiber yarns. The yarn 26 of multi-filament or multi-fiber is introduced into the molten resin chamber 14 as shown in FIG. 1 through a yarn inlet 24, into the adapter 23. The yarn 26 after entry into the adapter 23 is centrally positioned by passage under a bar 30 (see FIG. 3) and tracted on a pathline axially aligned between inlet 18 and outlet 20. The impregnated yarn 26 is discharged from the apparatus 10 through the sizing die 22 which wipes excess molten resin from the impregnated strand and yields a desired product of any size or shape, in accordance with the sizing die 22. The sizing die 22 may be selected to also shape the yarn into a final configuration, such as, for example, a flat tape or a round yarn. The adaptor 23 in the inlet 18 may be attached to a source of molten resin 32 such as a conventional extruder. Molten resin 32 passes from the extruder (not shown in FIG. 1) through adaptor 23 into the resin chamber 14. The unimpregnated continuous length of yarn 26 passes into the adaptor 23 and the molten resin 32 through inlet 24. Referring briefly to FIG. 3, there is seen an enlarged view of the adapter 23 in cross-section, showing details of the yarn 26 entry into a bath of molten resin 32 as it enters inlet 18. A bar 30, under which yarn 26 travels, submerges the yarn 26 in the molten resin 32.

Referring again to FIG. 1, it is seen that the pathline upon which yarn 26 follows during its passage through the resin 32 contained in the resin chamber 14 is such that it passes between a plurality of opposing surfaces 40, 42. In this way, as the yarn 26 passes through the plurality of surfaces 40, 42 the individual filaments and/or fibers making up the yarn 26 are spread apart and worked so that resin picked up by yarn 26 in the chamber 14 is worked into the structure of the continuous length 26, thereby thoroughly wetting and encapsulating each and every filament and/or fiber making up the structure of the continuous length 26.

The first pair of opposed surfaces 40, 42 is such that surface 40 is beneath surface 42. Progressing toward outlet 20, the surfaces are alternately reversed, i.e.; the next pair has surface 40 above surface 42. The next adjacent pair again reverses the position of surfaces 40, 42, as occurs in the last pair of surfaces 40, 42 shown in the FIG. 1. In the preferred embodiment apparatus 10, each surface 40 is identical to every other surface 40, and the surfaces 42 are each identical to each other surface 42. In the preferred embodiment apparatus 10, each surface 40, 42 as shown is a movable roller, however these surfaces may be fixed in position and non-rotatable on the shafts 50, 52. Essential to the apparatus 10 of the invention is the size, shape and configuration of each surface 40, 42 and the spacing between surfaces 40, 42. During operation, the yarn 26 passes on the pathline between each surface 40, 42. The spacing between surfaces 40, 42 is such that the yarn 26 is in contact with each surface 40, 42 and preferably squeezed between the surfaces 40, 42 during passage between inlet 18 and outlet 20. To assist in adjusting the squeeze and the space between surfaces 40, 42, one or both of the surfaces 40, 42 in each pair may be adjustably positioned or mounted to accommodate yarns of various dimensions. As shown in the preferred embodiment apparatus 10 of the invention, the lower surfaces of surfaces 40, 42 are mounted on an adjustable screw 46 so that the space 48 between surfaces 40,42 may be adjusted for the purpose described above.

Figure 2:
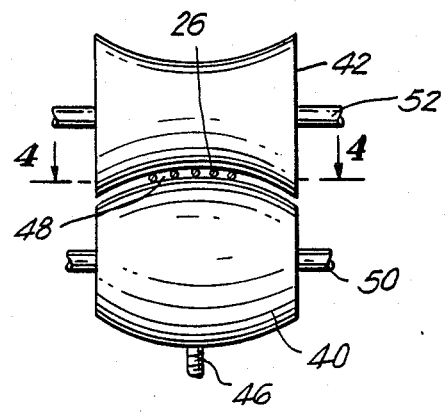
FIG. 2 is an enlarged view of the components 40, 42, seen at an angle perpendicular to the view shown in FIG. 1.

Referring now to FIG. 2, an enlarged view of the components 40, 42 seen perpendicular to the view shown in FIG. 1, the configuration and further details or the surfaces 40, 42 may be seen. The lower surface 40 is a convex surface, which preferably is a roller rotatably mounted on shaft 50 and spaced apart from a concave surface 42 which as shown is preferably a roller surface rotatably mounted on shaft 52. The adjustable screw 46 will move surface 40 towards and away from surface 42 so that the space 48 can be adjusted. In this way a continuous length of yarn 26 passing therethrough will be squeezed between surfaces 40, 42. In the next and in alternating pairs of surfaces 40, 42 the positions of the surfaces 40, 42 are reversed.

Figure 4:
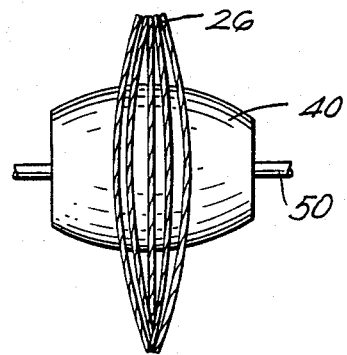
FIG. 4 is a view along lines 4—4 of FIG. 2.

FIG. 4 is a view along lines 4—4 of FIG. 2 and shows the spreading of individual filaments and/or fibers within the continuous lengths of yarn 26.

Those skilled in the art will appreciate that many modifications may be made of the preferred embodiment apparatus 10 of the invention as described above, without departing from the spirit and the scope of the invention. For example, the pathline over which the continuous length 26 travels need not be in a straight line (although this is preferred for simplicity) but may be along a tortured or course changing pathline. Also, the continuous length of yarn 26 may be introduced into the resin chamber 14 through an opening or inlet separate and apart from the inlet 18 carrying molten, thermoplastic resin from an extruder. Furthermore, as mentioned above both of the surfaces 40, 42 may be fixed in position or on a floating adjustable shaft in order to increase or decrease the squeezing action of the surfaces upon the continuous length 26. The surfaces 40, 42 may also be freely rotating rollers, passive or driven to increase the speed of the continuous length of yarn 26 during its passage through the apparatus 10. It will also be appreciated that the apparatus 10 may include heating means to maintain the thermoplasticity of resin 32 within the resin chamber 14. Any conventional means of heating the apparatus 10 may be employed for this purpose. Thus, thermoenergy may be applied to any point or points within or along the apparatus 10 to maintain a molten state of thermoplasticity of the polymeric resin contained within the resin chamber 14. Heater elements may include any conventional heating means for maintaining a predetermined melt temperature, including an element thermally energized by heated fluid including gas or liquid heat transfer mediums. Conveniently, heater elements 60 are electrically energized resistance heaters, energized by electrical energy (not shown in figures) by connection thereto through an electrical conductor. Thermocouples and temperature sensors may also be associated with the heater means (as is well known in the art) with appropriate circuit switches for energizing or deenergizing the heater means so that predetermined temperatures may be maintained. In this way, the temperature of the resin 32 within chamber 14 and within or on the continuous lengths 26 may be maintained at a range promoting the flow of the resin 32 around the individual filaments or fibers making up the continuous lengths 26 during its passage through the apparatus 10.

The following Example describes the manner and the process of making and using the invention and sets forth the best mode contemplated by the inventor for carrying out the invention.

EXAMPLE 1

Apparatus is provided meeting the description of the apparatus 10 shown in the accompanying drawings. The sizing die component has a die orifice of 1.58 mm. A continuous length of fiberglass yarn (250 yield fiberglass; Hybond 2079, PPG Industries) is threaded through the apparatus. A thermoplastic resin (polycarbonate resin; LEXAN® 140, General Electric Co.) having an intrinsic viscosity of 0.5 dl/g is extruded into the apparatus 10 while the yarn is tracted through the apparatus 10 at a speed of 2.1 meters/minute under a tension of circa 10.8 kg. The temperature of the resin extruded is circa 250° C. and is maintained at the same temperature within the apparatus 10. The flat tape product resin impregnated strand comprises 40% by weight of resin and visual examination under 10 power magnification does not reveal any resin voids between glass fibers.

What is claimed is:

1. Apparatus for impregnating a continuous length of multifilaments or multifiber with a polymeric resin, which comprises;

a housing enclosing a molten, thermoplastic polymeric resin chamber and having a housing wall defining the chamber;

an inlet through the wall, providing open fluid communication between the chamber and the exterior of the housing;

an outlet through the wall, providing open fluid communication between the chamber and the exterior of the housing;

means for introducing molten, thermoplastic polymeric resin into the inlet, associated with the inlet;

means for introducing into the chamber, a continuous length of multifilament or multifibers;

a sizing die associated with the outlet for sizing the continuous length following impregnation in the chamber;

a pathline through the chamber, between the means for introducing the continuous length into the chamber and the outlet and the sizing die;

a convex surface mounted in the chamber and on the pathline, said mounting placing the pathline transverse to the arc of the convex surface;

a concave surface adapted by size and configuration to mate with the convex surface, mounted in the chamber and on the pathline, spaced apart from the convex surface and opposite the convex surface, whereby a passage on the pathline is formed for travel of the continuous length between the concave and the convex surfaces, said traveling length being in contact with both concave and convex surfaces.

2. Apparatus of claim 1 wherein the means for introducing into the chamber, a continuous length of multifilament or multifiber is an inlet into the means for introducing resin.

3. Apparatus of claim 1 wherein the sizing die shapes the impregnated length.

4. Apparatus of claim 1 wherein the pathline is straight.

5. Apparatus of claim 1 wherein the concave and the convex surfaces are fixed in position.

6. Apparatus of claim 1 wherein one of the concave and the convex surfaces is fixed in position.

7. Apparatus of claim 1 wherein the convex and the concave surfaces are movable in position.

8. Apparatus of claim 1 wherein the space is adjustable.

9. Apparatus of claim 1 wherein the concave and the convex surfaces are rotatable rollers.

10. Apparatus of claim 1 wherein there are a plurality of convex and concave rollers.

11. Apparatus of claim 1 wherein pairs of convex and concave surfaces alternate in position.

12. Apparatus of claim 1 wherein said mounting places the pathline perpendicular to the arc of the convex surface.

* * * * *